3,566,332
WALL EXTENSION SOCKET
John Bonhomme, Brooklyn, N.Y.
(430 W. 119 St., New York, N.Y. 10027)
Filed June 9, 1969, Ser. No. 831,322
Int. Cl. B65h 75/48; H01r 11/00; H02g 11/02
U.S. Cl. 339—28
3 Claims

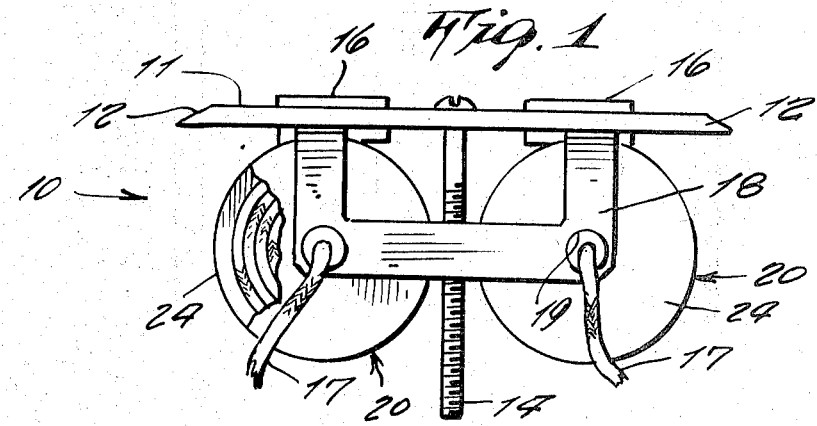
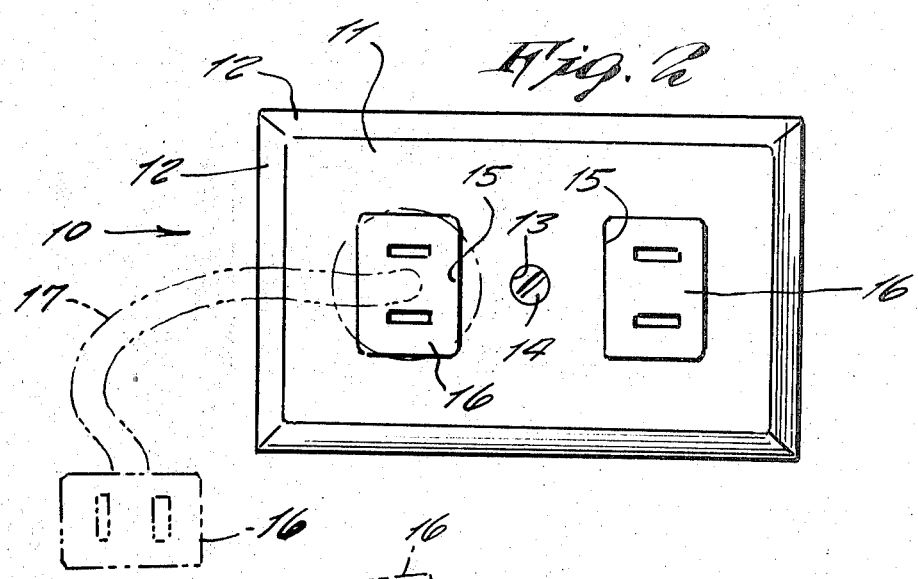
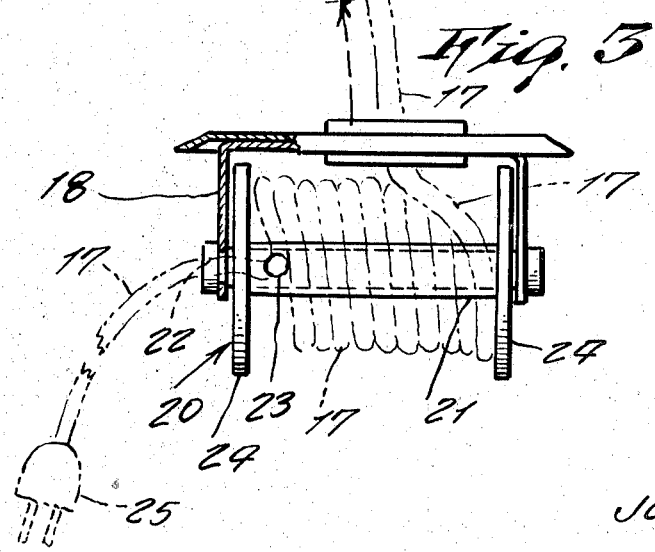
INVENTOR
JOHN BONHOMME

ABSTRACT OF THE DISCLOSURE

A reel unit for a plurality of electric extension cords, one end of the cords being secured to a house outlet receptacle the unit being mounted on a wall or base board of a room the unit including reels with the extension cords being wound up thereupon, and the opposite ends of the extension cords being able to be unreeled from the reels so as to reach a plug of an appliance electric extension cord.

---

This invention relates generally to electrical extension cords more specifically it relates to electrical extension cord reels.

A principal object of the present invention is to provide a wall extension socket comprising a reel having an extension cord wound up thereupon, one end being plugged into a house outlet socket and the other end being able to be unwound from the reel a sufficient amount so as to reach an electrical appliance extension cord which is located a relatively far distance from the house outlet socket.

Another object is to provide a wall extension socket which includes a pair of the above described reels mounted on the rear of a conventional appearing wall socket plate that can be mounted upon a wall or base board.

Yet another object is to provide a wall extension socket where in only a required length of cord needs to be unreeled to make a connection, thus eliminating the extra cord length laying about the floor and presenting an unsightly appearance.

Other objects are to provide a wall extension socket which is simple in design, inexpensive to manufacture, rugged in construction, easy to use and efficient in operation.

These and other objects will be readily evident upon a study of the following specification and the accompanying drawing wherein:

FIG. 1 is a side elevation view of the invention.
FIG. 2 is a front view thereof.
FIG. 3 is an end view thereof.

Referring now to the drawing in detail, the reference numeral 10 represents a wall extension socket according to the present invention, wherein there is a wall socket plate 11 of conventional appearance, the plate 11 comprising a rectangular member having bevelled edges 12 and provided with a central opening 13 for receiving a mounting screw 14 securable either to an outlet box mounted in a wall or otherwise to a wall or baseboard directly.

The plate 11 has a pair of central openings 15 into which there are removably seated a pair of female receptacles 16, each of which is connected to one end of an electric cord 17 extending through the opening 15.

A bracket 18 is secured to a rear side of the plate 11, the bracket having bearings 19 supporting rotatably free the opposite ends of a pair of reels 20, each of which includes a hollow axial shaft 21 with an opening 22 in one end thereof and a side opening 23 located between enlarged flanges 24 between which the cord 17 is reeled; and the opposite end of the cord is inserted respectively through the side opening 23 and end opening 22, the terminal end of the cord being attached to a male plug 25 receivable into a house outlet socket, as shown in FIG. 3, or directly to the terminals in the wall electric outlet box.

In operative use, when it is desired to attach a far located lamp or electrical appliance to an electrical power source, the receptacle 16 is pulled out of the plate 11, as shown by phantom lines in FIG. 2, and the receptacle is connected to the male plug of the lamp or appliance extension cord. As the cord 17 is pulled, the reel rotates. Possibly six feet or more of cord may be carried on each reel. Thus only the amount of cord needed is pulled from the reel so to eliminate extra cord length strewn along a floor. To remove a lamp or appliance, a person needs only to reel up the cord 17 upon the reel. A return spring may be provided at each reel so to automatically rewind the cord, as wished by a manufacturer. Likewise a delent may also be included so to retain the reel in an unwound position without applying a pulling stress on the cord 17.

While various changes may be made in the detail construction, it is understood that such changes will be within the spirit and scope of the present invention.

I claim as follows:

1. In a wall extension socket, the combination of a front plate securable over a wall surface, a bracket mounted on a rear side of said plate, said bracket supporting a pair of freely rotatable reels each of which has an extension cord reeled up thereupon, one end of said extension cord being secured to a male plug attachable in a house outlet socket and the other end of which is attached to a female receptacle removably seated on said front plate.

2. The combination as set forth in claim 1 wherein each said reel includes a hollow axial shaft having an end opening at one end thereof, and a side opening along said shaft between a pair of enlarged flanges between which said cord is reeled, one end of said cord being inserted first through said side opening and then through said end opening, said cord end carrying said male plug.

3. The combination as set forth in claim 2 wherein said plate includes a pair of central openings in which said female receptacles are removably seated.

References Cited
UNITED STATES PATENTS

| | | | |
|---|---|---|---|
| 1,117,548 | 11/1914 | Bouchery | 191—12.4 |
| 2,438,515 | 3/1948 | Mohler | 242—107.1X |
| 2,976,374 | 3/1961 | Poulsen | 191—12.4 |
| 2,979,576 | 4/1961 | Huber | 191—12.4 |
| 3,372,887 | 3/1968 | Ladany | 242—107.13 |

MARVIN A. CHAMPION, Primary Examiner
T. P. LEWIS, Assistant Examiner

U.S. Cl. X.R.
191—12.4; 242—107.13; 339—5, 123, 147